(No Model.)
A. SCHNOOR.
WEED GATHERER AND TURNER.
No. 337,442. Patented Mar. 9, 1886.
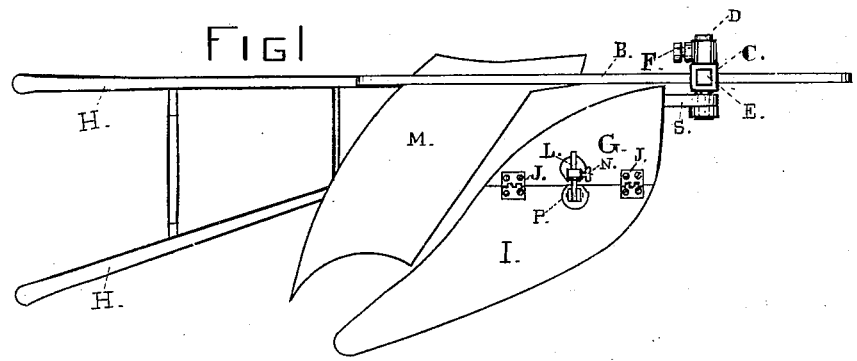
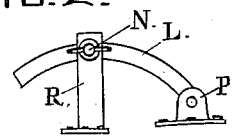
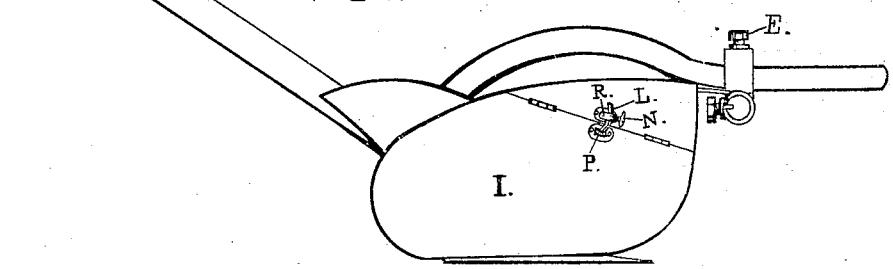
ATTEST,
John H. Redstone
L. E. Redstone
INVENTOR,
August Schnoor

UNITED STATES PATENT OFFICE.

AUGUST SCHNOOR, OF SAN FRANCISCO, CALIFORNIA.

WEED GATHERER AND TURNER.

SPECIFICATION forming part of Letters Patent No. 337,442, dated March 9, 1886.

Application filed June 15, 1885. Serial No. 168,696. (No model.)

*To all whom it may concern:*

Be it known that I, AUGUST SCHNOOR, a citizen of the United States, residing in the city and county of San Francisco, and State of California, have invented a new and useful Straw, Weed, and Stalk Gatherer and Turner for Plows, of which the following is a specification.

My invention relates to straw, weed, and stalk gatherers and turners for plows; and it consists in certain devices for adjustment and operation of a jointed straw, weed, and stalk gatherer in connection with a plow.

My invention will be more readily understood by reference to the accompanying drawings and the letters marked thereon.

Figure 1 is a plan view of a plow with my improved gatherer attached. Fig. 2 is a view of a detached part to show the adjusting-segment for the gatherer. Fig. 3 is a side elevation showing a plow with my improvement attached the same as in Fig. 1.

H and H represent the plow-handles.

B represents the plow-beam; M, the mold-board.

G represents the portion of the gatherer attached to the spring.

I represents the hinged part of the gatherer.

J and J represent the hinges.

C represents the adjustable holder.

D represents the spring-attaching journal.

S represents the gatherer-spring.

E represents the set-bolt for attaching the adjustable holder to the plow-beam B.

F represents the set-bolt for securing the adjustment of the spring-attaching journal D to hold the gatherer in the required position.

L represents the adjusting-segment for the gatherer, P the hinge-post for the segment L, and N represents the set-screw for securing the adjustment of the hinged part I in the set-post R.

The following is the construction and arrangement of my improved gatherer: I generally form it of sheet metal hinged, to allow the adjustment of the outer part, I, so as to open out or contract the same, to the plow. The inner part, C, is attached to the spring S, which is held by the spring-attaching journal D, which is adjustable in the holder C by means of the set-screw F. The holder C slides upon the plow-beam B, and is set fast upon the same by means of the set-bolt E when it reaches the required position.

The following is the operation of the same: When plowing in a field of high stiff stalks or weeds, the gatherer is raised up to prevent too much resistance by the stiff stalks against the gatherer, and the outer part or wing, I, is swinging, so as to adjust it to the edge of the furrow or as near as may be required to catch all the stalks and throw them down into the furrow as the sod is turned over them.

When the stubble or weeds are light, the gatherer is adjusted by throwing it down close to the ground, and the set-screw F is set fast against the spring-attaching journal D, holding it firmly. The wing or outer part, I, is then adjusted to the line of the furrow as before. When the wing I is adjusted closely down, and any stiff stalk or other obstruction comes in contact with the same, the spring S allows the gatherer to rise up over it and pass on.

Having thus described my invention, what I claim, and desire to secure by Letters Patent, is—

The hinged gatherer G and O, having the hinges J and J, and the adjusting-segment L, hinged at P and set fast by the set-screw N, and the spring S, in combination with the spring-attaching journal D, the holder C, and set-screws F and E, for the purpose of gathering light or heavy stalks, weeds, or stubble, constructed and operated substantially as set forth.

AUGUST SCHNOOR.

Witnesses:
JOHN H. REDSTONE,
L. E. REDSTONE.